Figure 1:
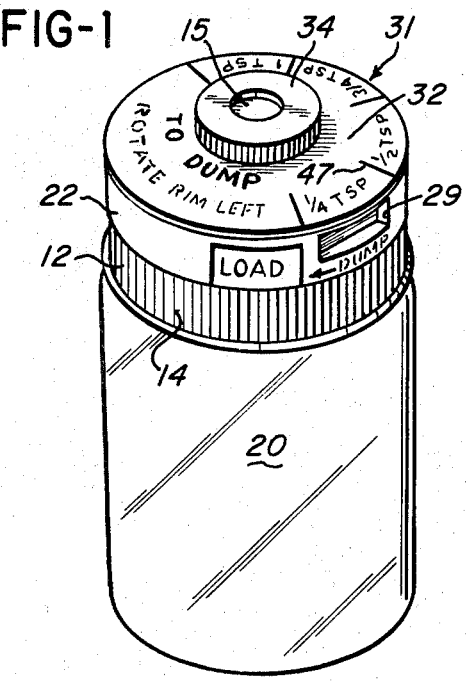

United States Patent
Slayton et al.

[15] 3,695,487
[45] Oct. 3, 1972

[54] DISPENSER CAP

[72] Inventors: Jack E. Slayton, 5795 Rosebury Dr., Dayton, Ohio 45424; Eugene F. Whipp, 7704 Little Richmond, Dayton, Ohio 45427

[22] Filed: Oct. 19, 1970

[21] Appl. No.: 81,880

[52] U.S. Cl. .................222/430, 222/42, 222/452
[51] Int. Cl. ...........................................G01f 11/48
[58] Field of Search......222/426, 427, 430, 436, 450, 222/451, 452, 168.5, 367, 370, 305, 42, 48; 221/263, 264, 265

[56] References Cited

UNITED STATES PATENTS 3,269,612   8/1966   Bode......................222/370 X
2,898,010   8/1959   Tepper..................222/370 X
3,018,924   1/1962   Reed......................222/367 X Primary Examiner—Samuel F. Coleman
Assistant Examiner—Francis J. Bartuska
Attorney—Jerome P. Bloom

[57] ABSTRACT

A dispenser cap for a container such as a jar, can, bottle or like receptacle containing a pourable material. The cap per se incorporates structure for dispensing measured quantities of material from the container and includes a control member settable for quantity selection purposes.

12 Claims, 6 Drawing Figures

PATENTED OCT 3 1972

3,695,487

INVENTORS
JACK E. SLAYTON
EUGENE F. WHIPP
BY Jerome P. Bloom
ATTORNEY

DISPENSER CAP

BACKGROUND OF THE INVENTION:

This invention relates to dispensing caps for mount on jars, bottles, cans and like containers to exert a degree of precision control over the contained material to be dispensed. Although obviously not so limited, the invention will be described with special reference to the dispensing of food staples such as sugar, coffee or the like. Embodiments have advantage in that they enable one to better satisfy individual taste and avoid waste, and they have special utility where for dietary or recipe purposes it is desirable to dispense materials form their containers in uniform, measured amounts.

The problem in serving or dispensing food products or food ingredients from their containers in accurately controlled amounts is widely appreciated. As known, it has heretofore been met, in the main, by use of accessories separate from the container itself, that is by use of measuring cups, spoons and the like. This is less than a desirable recourse, particularly in dealing with fractional spoonfuls, for which purposes multiple spoons must be kept on hand. Moreover, accurate measurement may be important in connection with dispensing from containers used away from the kitchen, such as at the dining table or in a restaurant where measuring spoons are not conveniently available.

A variety of dispensing caps have been previously proposed in an effort to ease the above noted problems. However, none have heretofore met the criterion of simplicity of structure together with simple and easily manipulated means for obtaining by way of a cap relatively precise quantities of a container's contents in variable controlled amounts.

To pinpoint the problems and highlight the benefit of the invention, let us consider, by way of example, the invention is applicable to instant coffee jars, from which coffee is commonly dispensed by spoon. The dispensing of uniformly accurate quantities in amounts desired has proven difficult by this or any heretofore provided means, causing a strength and taste variation from cup to cup. The problem has been compounded by variations in individual preferences as to strength so that the serving of coffee according to taste has become at best an approximation, with inconsistent and most frequently unsatisfactory results.

SUMMARY OF THE INVENTION:

The present invention provides a cap unit ordinarily applicable to a container such as a jar, bottle, can or the like, in replacement of the original closure cap but which could be made a part of the original container, if desired. The invention structure comprises flow control means enabling the dispensing or pouring of the container contents in measured quantities. Dial means forming part of the control is settable to dictate any one of a plurality of such quantities being dispensed at any one instant, and, at any selected setting, there will be dispensed a substantially exact quantity as desired. In repeated uses there will be dispensed uniformly accurate portions of the container contents.

In a preferred embodiment here illustrated the dial means performs the described selection process. In conjunction therewith there is a cap element which rotates on and relative to a basic capping element for the container's contents. The latter provide means for trapping within the cap structure a measured quantity of the related container contents in response to inverting of the container. The rotating cap element is a part which is relatively adjustable between "Load" and "Dump" positions whereby a measured quantity may be trapped in the cap structure in one motion and dispensed therefrom in a following motion.

While the cap unit is shown as a separable part of a container, it could of course be formed integral therewith.

It is a primary object of the invention to provide a dispenser cap which is economical to fabricate, most efficient and satisfactory in use, adaptable to a wide variety of applications and unlikely to malfunction.

It is a further object of the invention to provide a cap adapted to simultaneously serve as a closure for a jar or other container and as a means to dispense measured quantities of the container contents.

A further object of the invention is to provide a dispenser cap for a container incorporating means selectively to vary quantities which may be dispensed therethrough.

Another object of the invention is to provide a dispenser cap having relatively movable parts for selection and dispensing of measured quantities of a container contents while retaining a compact, unitary form approximating that of a conventional closure cap.

Still another object of the invention is to provide a dispenser cap of simplified, inexpensive construction which may be supplied separately as a replacement cap or as an original element of a container unit such as a jar, bottle, can or the like.

An additional object of the invention is to provide a container cap possessing the advantageous structural features, the inherent meritorious characteristics and the means and mode of operation herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Figure 2:
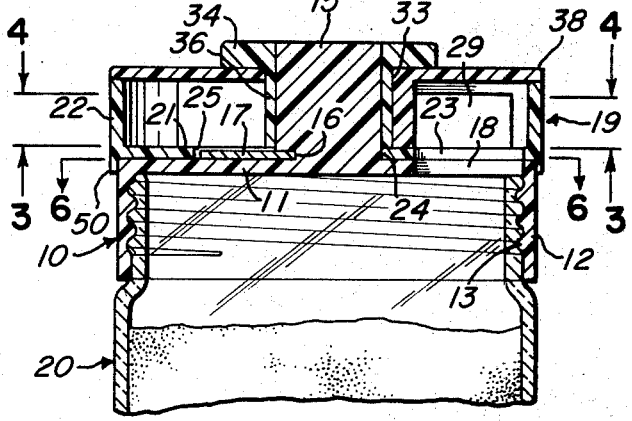
Figure 3:
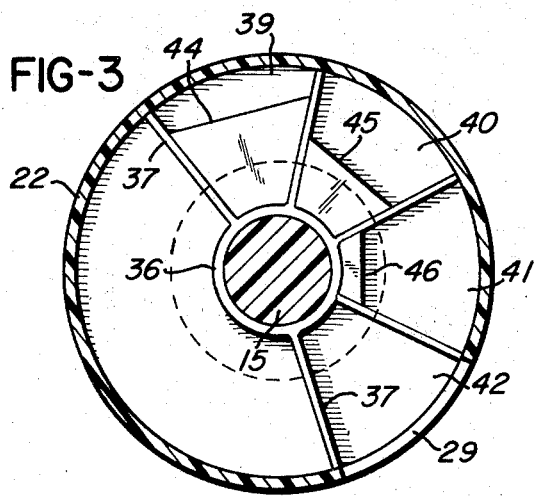
Figure 4:
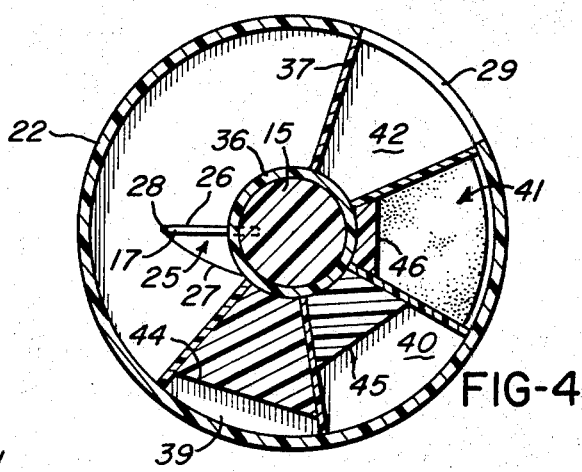
Figure 5:
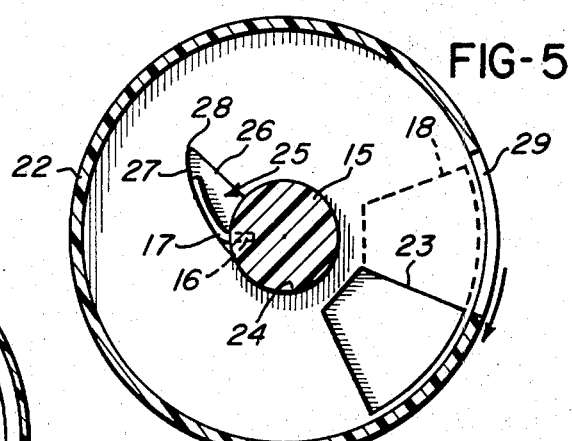
Figure 6:
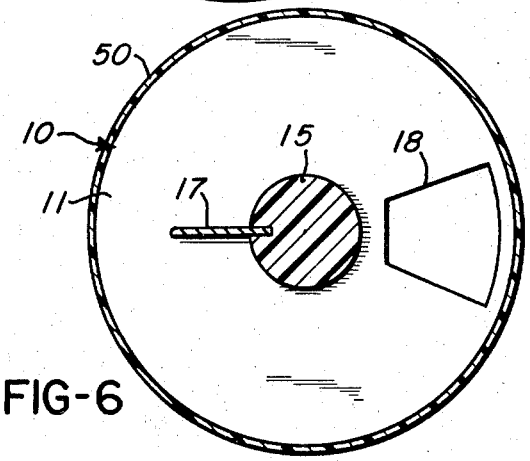

Referring to the accompanying drawing wherein is shown one but obviously not necessarily the only form of embodiment of the invention, FIG. 1 is a view in perspective of a cap in accordance with the illustrated embodiment of the invention, shown mounted on a jar;

FIG. 2 is a view of the cap in vertical cross section, showing a fragment of the related jar;

FIGS. 3 and 4 are views in horizontal section, taken substantially and respectively along lines 3—3 and 4—4 of FIG. 2;

FIG. 5 is a view like FIG. 4, with the dial member omitted, showing an alternate position of adjustment of elements of the cap; and FIG. 6 is a view taken on line 6—6 of FIG. 2.

Like parts are indicated by similar characters of reference throughout the several views.

Referring to the drawings, a cap unit in accordance with the illustrated embodiment of the invention includes a first cap member 10, the flat planar part 11 of which is disc-like in shape and serves to bridge the opening from a jar-like container 20. The peripheral edge of part 11 terminates in a downturned flange 12, the inner diameter of which corresponds to the external diameter of the mouth of the jar 20. Formed integral with the inner surface of the flange 12 is a screw thread 13 adapted to mate with a complementarily formed external screw thread on the mouth of the jar. The outer surface of the flange 12 is provided with corrugations 14 extending from top to bottom, providing a friction grip surface having obvious utility. Thus, in the example shown the cap unit includes a basic cap member threadedly mounting in capping relation to a jar 20 containing a pourable, granular material.

It is here noted that while the member 10 is shown as threaded to the jar 20, any other frictional connection may be provided therebetween without departing from the concept of the invention.

Projecting axially upward of the center of the planar portion 11 of the member 10, in a direction opposite to the flange 12, is a stub shaft 15. The shaft 15 is shown integral with the member 10. However, it may be formed separately and adhesively fixed or otherwise integrated with the part 11. Near its lower end, the stub shaft 15 has a radial recess 16. A flexible spring finger 17 having one end installed in the recess 16, and being anchored thereby, extends outwardly of the shaft 15 in an overlying substantially contacting, bearing, relation to the upper surface of part 11.

The part 11 is also formed with a radially offset opening 18, at a location generally opposite to that overlaid by spring finger 17. The opening 18 is segmental in form, having approximately radially directed sides connected at their outer ends by a uniform curve and at their inner ends by a straight line perpendicular to a radius of the part 11. Note from the drawings that the opening 18 is elongated in a radial sense to occupy a major part of the distance from the shaft 15 to the flange 12. It begins at a point spaced immediately outward of the shaft and terminates at its outer end just short of flange 12.

Further comprised in the cap unit is a second cap member 19. The member 19 has a generally annular configuration, including a flat planar portion 21 of disc-like form, the central aperture 24 of which accommodates the projection therethrough of the shaft 15. The peripheral edge of the planar portion 21 has formed integral therewith a cylindrical flange 22. A major extent of the flange 22 projects upwardly and a small portion 50 thereof projects downwardly from the planar portion 21, in a sense perpendicular thereto, for purposes to be further described. Formed in the portion 21 is a segmental opening 23 corresponding in position, configuration and size to the opening 18 in the member 10.

As noted, portion 21 has a central opening 24, creating the annular configuration of the member 19. The opening 24 has a diameter slightly exceeding the external diameter of the shaft 15 and a circumferential part of the opening 24 is extended outwardly to form in the inner periphery of portion 21 a substantially radial recess 25. See FIGS. 4 and 5 in this respect. The recess 25 is formed with a straight or radially directed side 26 and a curved side 27 merging with the side 26 in an apex 28.

In the flange portion 22 of member 19 is a through opening 29 of appreciable circumferential extent. The opening 29 is offset, in a circumferential sense, from opening 23. Attention is directed to FIG. 2 of the drawings wherein it may be seen that in assembly of the cap unit, to be further described, planar portion 21 bearingly seats on the planar part 11 of the member 10 while the short dependent portion 50 depends about the outer surface of the flange 12, at its upper portion, in bearing relation thereto.

Still further comprised in the cap unit is a dial control member 31. This is constructed of a flat planar portion 32 of disc-like form having a diameter substantially equalling that of the outer periphery of flange 22 of member 19. In the center of portion 32 is a round opening 33 having a diameter somewhat exceeding that of shaft 15. Superposed on the upper surface of portion 32 is an annular member 34 of relatively small diameter on the outer edge of which are vertical corrugations 35. Formed integral with and projecting axially from the inner peripheral edge of the member 34 is a cylindrical bearing sleeve 36. The latter has an outer diameter substantially matching the diameter of opening 33. Its inner diameter substantially matches the diameter of shaft 15. Annular member 34 and bearing sleeve 36 are suitably integrated. As a matter of fact, they may be made in one piece, as desired. The unitary structure so formed is in turn fixed to portion 32 so that a turning motion applied to member 34 is effective simultaneously to rotate portion 32. The member 34 occupies a position that the outer peripheral portion of its undersurface seats to the upper surface of portion 32 about the opening 33 while the sleeve 36 projects through and beyond the opening 33 below the undersurface of portion 32.

A plurality of circumferentially spaced vanes 37 radiate, in a radial sense, from the sleeve 36 below the portion 32. At their inner ends, and at their upper edges, the vanes 37 are secured to the sleeve 36 and to portion 32 respectively. They are accordingly a part of a unitary assembly comprising portion 32, member 34 and sleeve 36. At their outer ends the vanes 37 terminate just short of the peripheral edge of portion 32 to leave thereon a narrow, annular, peripherally projecting ledge 38. The vanes 37 are provided in sufficient number and spacing to define a circumferential series of pockets. In the illustrated instance five vanes are arranged to form a series of four pockets 39–42 of approximately equal size. These occupy somewhat more than half the area of the undersurface of portion 32 with the remainder being represented by an unused space 43. The size and therefore the effective volume of pockets 39, 40 and 41 is reduced by respective inserts of varying size defining wall structures 44, 45 and 46 in the inner ends of the respective pockets. These inserts bridge adjacent vanes and have a height to correspond to the vane height. The effective or useful volume of the pockets 39, 40 and 41 is accordingly reduced to that unoccupied by the pertaining insert. The wall structures 44, 45, 46 may be defined by solid elements or elements formed by connected panels to provide the inserts. In either event, the inserts are fixed to and form a part of the dial assembly. As noted, they are of different size whereby to define differential useful volumes in the respective pockets 39, 40 and 41. The latter pockets provide spaces which are fractional parts of a basic volumetric capacity as defined by the pocket 42 which contains no blocking or filler insert means as do the pockets 39-41.

In the example shown, pocket 42 is designed to have a volumetric capacity of one teaspoon, pocket 41 a capacity of three-fourths teaspoon and pockets 40 and 39 respective capacities of one-half and one-fourth teaspoon. It will be understood that in a manner such as illustrated different basic and differently divided measures are made possible, all in accordance with the number and spacing of vanes 37 and selection of space filling inserts positioned within the defined pockets.

The upper surface of dial portion 32 is inscribed or imprinted with instructional and measure selection information. Spaced radial lines 47 are placed generally to overlie the vanes 37 and between these the designations "1 Tsp.", "¾ Tsp.", "½ Tsp." and "¼ Tsp." are placed respectively to overlie pockets 42, 41, 40 and 39. Overlying the unused space 43, the upper surface of portion 32 is inscribed with operating instructions the meaning of which will more clearly appear from the description to follow.

Note that on the exterior of flange 22 of member 19 there is inscribed or imprinted additional information. Below opening 29 is the word "Dump". In circumferentially offset relation to the opening 29, and in substantially embracing relation to opening 23 are vertical markings 48 and within the bounds of such markings the word "Load".

In the assembly of the cap unit, member 19, which provides a rotatable rim segment thereof, is positioned in aligned, inverse relation to cap member 10 to seat its disc portion 21 to bear on disc portion 11 of cap member 10. In the process, the short dependent extremity 50 of flange 22 extends about and in a relative bearing relation to the upper portion of the outer surface of flange 12. The flange portion 50, thus fits over the cap member 10 to center member 19 in a vertically projected bearing relation thereto. In the application of the member 19, it is rotatively oriented to place recess 25 to accommodate the projection therein of spring finger 17. Simultaneously shaft 15 projects through opening 24. As seen in FIG. 4, with the member 19 properly disposed, the spring finger is normally positioned in abutting relation with the side 26 of the recess 25. At the time the tip of the spring finger 17 enters the apex portion 28 of the recess, it so exerts a resilient influence tending yieldingly to maintain the member 19 in an annular position of adjustment wherein opening 23 overlies and substantially registers with the opening 18 in the cap member 10.

After positioning of member 19 over shaft 15, dial member 31 is installed with its inscribed side uppermost and the vaned structure on its underside, whereby the latter may be received within the confines of the rim defined by the flange 22 of member 19. In application of the member 31, a relative approaching motion of the parts is continued until the projecting ledge 38 on portion 32 seats on the upper edge of flange 22, at which time the lower edges of vanes 37 seat in substantially sliding, bearing, contact with planar portion 21. The outer ends of the vanes position in substantially similar bearing contact with the inner wall of flange 22. The several vane defined pockets 39-42 are accordingly closed from communication with outside the cap unit, except to the extent they may, by adjustment of their original position, be connected through opening 18 and rim opening 29 in use of the cap unit. The sleeve 33 achieves a relatively close friction fit on shaft 15. The dial member accordingly does not slide off the shaft when the cap unit is inverted. The fit is that close that it tends to frictionally maintain rotative positions to which the dial may be set in reference to shaft 15.

In the example shown, in use of the cap unit it is mounted as a closure for a jar 20 containing a material such as granular coffee 30 capable of being dispensed by pouring. The basic connection of the cap unit, as is obvious, is through the cap member 10 having a friction connection to and mounting over the mouth of the jar. Accordingly, as the cap member is applied, opening 18 provides, provided it is not blocked, a passage from the jar interior to the interior of the cap unit. In the first instance dial member 31 will be rotatively adjusted to locate a selected measure indication at the "Load" position as represented on the side of the flange 22 providing the rim portion of member 19. With this done, therefore, a selected one of the pockets 39-42 corresponding to the selected measure indication will overlie opening 23 which in turn aligns with opening 18. The latter is enforced by the spring finger 17 nesting in the recess 25 of and resiliently positioning member 19 thereby. Thus, in a normal position of the respective parts of the cap unit, a selected pocket is accordingly in communication with the jar interior. At the same time, such selected pocket, while disposing in adjacent relation to rim opening 29, is closed or effectively sealed therefrom by an interposing vane 37. As seen in FIG. 4, with a selected pocket at the load position, a pair of adjacent vanes 37 will isolate the selected pocket, restrictively communicating it with the jar interior through the openings 18 and 23. Now, if the jar, including the cap unit, is inverted, material within the jar will flow through openings 18 and 23 and fill the selected pocket. With the jar still inverted, the rim provided by the flange on the member 19 may be given an incremental turn leftward, with reference to the drawings, or in a direction clockwise of rotation as viewed in FIG. 1, to move member 19, against the bias of spring 17, from a "Load" position as shown in FIG. 4 to a "Dump" position shown in FIG. 5. In this manner opening 29 is caused to align peripherally with the selected pocket. Also, in response to such rotative adjustment of the member 19, opening 23 is displaced and the planar portion 21 of member 19 closes the opening 18. In the process there is trapped in the selected pocket a precise measurement of the previously admitted pourable material. The extent of the opening 29 is such to bridge the outer ends of the pair of vanes 37 which define the selected pocket to which the material has been introduced. The trapped material, representing a measured precise portion in accordance with the setting of dial member 31, is now freed to be dumped from the cap unit, which action may be accomplished by a quick tipping motion of the held jar.

As noted, rotative adjustment of the member 19 from "Load" to "Dump" position stresses and stores energy in the spring finger 17 as the curved side 27 of the recess 25 is caused to bear thereagainst. Once dumping is achieved and the member 19 released, the finger 17 will utilize its stored energy to assist in returning the member 19 to its normal "Load" position.

In summary, in use of the cap unit, therefore, the jar or other container is held and dial member 31 set for dispensing a desired portion. Annular member 34 with its edge corrugated may be conveniently used for this purpose to rotate the dial assembly on shaft 15. The jar is then inverted to fill the dialed pocket with the required portion. While the jar continues to be held inverted, member 19 is turned and in simultaneous actions a measured portion of material from the container is trapped and a passageway (opening 29) is opened for the dispensing of the precisely measured trapped portion of the material for dispensing thereof laterally through the side of the cap unit. As the rim or flange 22 of the member 19 continues to be held in a "Dump" position, the jar is tipped to dispense the measured portion through the opening 29. On release of the rim or flange 22, member 19 is returned automatically to "Load" position and the structure accordingly conditioned for another dispensing sequence.

The interaction between spring finger 17 and the sides of recess 25 effectively limits oscillatory motion of rim member 19 in use of the invention device.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any off its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

Having thus described my invention, I claim:

1. A dispenser cap unit, including a cap member constructed to close an opening from a container such as a jar, bottle, can or the like, said cap member having an opening through which contents of the container may be moved, a dial member rotatively adjustable on said cap member and having at its underside a plurality of pockets selectively aligned with the opening in said cap member by a selective relative rotation of said dial member whereby on tipping said container the selected pocket may be loaded therefrom through said opening, other means interposed between said cap member and said dial member rotatively operable to close the opening in said cap member and providing a discharge passage for channeling from said cap unit the contents of a loaded pocket, said interposed means being rotatively adjustable simultaneously to trap a precise portion of the contents of the container in a selected pocket and to expose the contents of the selected pocket to said discharge passage, said interposed means including a peripheral rimming portion mounting the same on said cap member for oscillatory motion relative to said cap member and to said dial member, said interposed means providing a portion paralleling the top surface of said cap member and disposing intermediate said top surface and said pockets, said parallel portion having a load opening adapted to alternately align with and misalign with the opening in said cap member under oscillatory rotative adjustment of said interposed means, said interposed means further having in its rimming portion a dump opening forming said discharge passage which is angularly displaced from the opening in said parallel portion and adapted to position in communicating relation with a selected pocket in alternating relation with said load opening.

2. A dispenser cap unit, including a portion constructed to close an opening from a container such as jar, bottle, can or the like, said portion having an opening through which contents of the jar may be moved, means mounting in connection with said portion providing a plurality of pockets selectively positioning to be loaded through said opening, means operative to selectively close said opening by a rotational adjustment thereof, and means defining a discharge passage for channeling from said cap unit the contents of a loaded pocket, said portion of said cap unit being provided by a cap element including a bridging portion having a top surface transverse to its central axis through which there is said opening for communicating said container contents with the interior of said cap unit, said means operative to selectively close said opening by rotational adjustment being a second cap-like element mounted on said first mentioned cap element and having a bridging portion in adjacent parallel relation to the said top surface of said first mentioned cap element and an upstanding flange peripherally thereof, there being a trough opening in said bridging portion of said second mentioned cap element movable therewith to be aligned and misaligned relative to said opening in said first mentioned cap element and a further opening in said flange angularly displaced from the last mentioned opening in said second cap element, said means providing said plurality of said pockets having in connection therewith control means for its relative rotary adjustment and wall structure dependent and forming with said flange and with said bridging portion of said second mentioned cap element said pockets, in a circumferential series thereof of different volumetric capacity, said control means being adjustable to position a selected pocket at a location over the opening in said first mentioned cap element, and said second mentioned cap element being rotatably adjustable between load and dump positions in which the opening therein through said bridging portion thereof and the opening in the flange thereof constituting said discharge passage are positioned respectively to provide for charging a pocket and for discharge thereof.

3. A dispenser cap unit according to claim 2 characterized by a cylindrical projection on said first mentioned cap element disposing axially thereof and said control means rotatably mounting thereof with a friction fit and said second mentioned cap element freely disposing on said first mentioned cap element for oscillatory motion, as required.

4. A dispenser cap unit according to claim 2 characterized by biasing means stressed by adjustment of said second mentioned cap element from a Load position to Dump position and arranged to apply a resilient force for return of said second mentioned cap element to Load position.

5. A cap unit according to claim 4 characterized by said biasing means comprising a flexible spring finger anchored relatively to said first mentioned cap element and disposing in a slot formed in said second mentioned cap element.

6. A cap unit according to claim 5 characterized by an upstanding cylindrical projection on said first mentioned cap element providing a mount for said second mentioned cap element and said control means, the latter of which includes a dial member for selectively orienting one of said pockets in a Load position, said flexible spring finger being installed to project laterally of said projection.

7. A dispenser cap unit according to claim 2 wherein the control means includes a dial member and said wall structure dependent therefrom comprises a plurality of spaced radially directed pocket walls of a length substantially to contact the inner surface of said flange, the space between adjacent pairs of pocket walls being differentially filled to very the effective open space between said walls and thereby to vary the volumetric capacity of said pockets which are defined thereby.

8. A dispenser cap according to claim 2 characterized by means substantially limiting said second mentioned cap element to oscillatory motion between said Load and Dump positions.

9. A dispenser cap unit, including a portion constructed to close an opening from a container such as a jar, bottle, can or the like, said portion having an opening through which contents of the jar may be moved, means mounting in connection with said portion and adjustable relatively thereto providing a plurality of pockets selectively positioning to be loaded through said opening, other means mounting in connection with said portion operative to selectively close said opening by a relative rotational adjustment thereof separately of said pocket positioning means, and means defining a discharge passage through said other means positionable at a selected pocket for channeling from said cap unit the contents of a selected loaded pocket.

10. A dispenser cap unit according to claim 14, wherein said portion closing the opening from the container is a cap member through an opening in which contents of the container may be moved, said pocket positioning means including a dial member rotatively adjustable on said cap member and having at its underside said pockets adapted to be selectively aligned with the opening in said cap member by a selective relative rotation of said dial member, said means operative to selectively close said opening in said cap member being interposed between said cap member and said dial member and rotatively operative selectively to separate a pocket loaded with the container contents from the container to provide for discharge of the pocket contents through said discharge passage.

11. A dispenser cap unit according to claim 10, wherein said interposing means is rotatively adjustable to and between load and dump positions in the former of which it opens communication between said opening in said cap member and a selectively positioned pocket and closes said pocket from communication with said discharge passage and in the latter of which it closes said opening from communication with a positioned pocket and opens said pocket to communication with said discharge passage.

12. A dispenser cap unit according to claim 11, wherein said interposing means comprises a flat planar portion superposing on said cap member and having a load opening aligned and misaligned relatively to the opening in said cap member by rotative adjustment to the said interposing means, said interposing means further including a flange-like rim portion having an opening constituting said discharge passage and angularly offset relatively to said load opening.

* * * * *

UNITED STATES PATENT OFFICE
CERTIFICATE OF CORRECTION

Patent No. 3,695,487             Dated October 3, 1972

Inventor(s)    Jack Slayton - Eugene Whipp

It is certified that error appears in the above-identified patent and that said Letters Patent are hereby corrected as shown below:

Col. 8, line 31, "trough" is corrected to read -- through --.

Col. 9, line 18, "very" is corrected to read -- vary --.

Signed and sealed this 13th day of February 1973.

(SEAL)
Attest:

EDWARD M. FLETCHER, JR.             ROBERT GOTTSCHALK
Attesting Officer                    Commissioner of Patents